United States Patent [19]
Herzog

[11] 3,969,652
[45] July 13, 1976

[54] ELECTRONIC BALLAST FOR GASEOUS DISCHARGE LAMPS

[75] Inventor: Rollie R. Herzog, Burnt Hills, N.Y.

[73] Assignee: General Electric Company, Carmel, Ind.

[22] Filed: Apr. 15, 1975

[21] Appl. No.: 568,175

Related U.S. Application Data

[63] Continuation-in-part of Ser. No. 430,830, Jan. 4, 1974, abandoned.

[52] U.S. Cl. .............................. 315/224; 315/287; 315/290; 315/308; 315/DIG. 7; 321/2; 323/DIG. 1
[51] Int. Cl.² ................. H05B 41/29; H05B 41/36; G05F 1/30
[58] Field of Search ............... 315/200 R, 206, 208, 315/224, 283, 287, 290, 291, 302, 307, 308, 311, 360, DIG. 5, DIG. 7; 321/2; 323/17, DIG. 1; 307/96

[56] References Cited
UNITED STATES PATENTS

| | | | |
|---|---|---|---|
| 3,365,650 | 1/1968 | Camp et al. | 321/18 |
| 3,486,070 | 12/1969 | Engel | 315/224 X |
| 3,551,777 | 12/1970 | Bingley | 321/2 |
| 3,590,316 | 6/1971 | Engel et al. | 315/308 X |
| 3,641,422 | 2/1972 | Farnsworth et al. | 323/DIG. 1 |
| 3,689,827 | 9/1972 | Quinn | 315/308 X |
| 3,707,648 | 12/1972 | Rosa | 315/DIG. 5 |
| 3,723,887 | 3/1973 | Panico | 315/208 X |
| 3,761,796 | 9/1973 | Jensen | 323/DIG. 1 |
| 3,781,653 | 12/1973 | Marini | 323/17 |
| 3,818,306 | 6/1974 | Marini | 323/DIG. 1 |

*Primary Examiner*—Alfred E. Smith
*Assistant Examiner*—E. R. LaRoche

[57] ABSTRACT

An electronic circuit for starting and operating gaseous discharge lamps. A DC input is connected to a time-ratio control (TRC) circuit which includes a regulating transistor, a sensing resistor and a coasting inductor connected in series. A flyback diode is connected to the inductor for providing a discharge path for the inductor. The TRC circuit serves to ballast the gaseous discharge lamp. An inverter is connected to the TRC circuit for driving the lamp with square waves. A starting circuit is provided and is connected to one of the lamp electrodes for starting the lamp. A transient protection circuit is provided for the inverter to shunt transients back to the input. A TRC drive and control circuit is connected to the TRC regulating transistor and sensing resistor for controlling the regulating transistor. Power for the circuits which control the regulating transistor, the inverter and the starting circuit is provided by a feedback power supply which is connected in a circuit relationship with the lamp so that it supplies power substantially only while there is operating voltage for the lamp.

32 Claims, 9 Drawing Figures

ELECTRONIC BALLAST FOR GASEOUS DISCHARGE LAMPS

This is a continuation-in-part application of prior filed application Ser. No. 430,830 filed Jan. 4, 1974, now abandoned.

BACKGROUND OF THE INVENTION

The present invention relates to an electronic ballast for starting and operating gaseous discharge lamps. More particularly, it relates to a means for operating and starting at least one gaseous discharge lamp utilizing solid-state circuitry and a feedback power supply for operating the accompanying control circuitry.

Gaseous discharge lamps, for example, fluorescent, sodium vapor, mercury, and others have a negative resistance characteristic. That is, as the current begins to rise in the lamp, the resistance across the lamp decreases thereby allowing more and more current to be drawn, eventually destroying the lamp. A means of limiting this current is, therefore, necessary to enable the lamp to operate at a sufficient intensity for proper illumination, yet, at such a current level so that the lamp will not run away with itself and thus be destroyed.

Various arrangements of inductors, transformers, capacitors, and resistors have been used to ballast gaseous discharge lamps. One of the most common devices used to ballast the lamp is an autotransformer-power capacitor arrangement connected in series with the lamp. One of the disadvantages of this conventional ballasting system is that peak energy stored in the reactive elements in the system must be maintained at relatively high levels to perform the ballasting functions and the relative rate of storage and release of this energy is low. Furthermore, large amounts of volt-amperes must be circulated in the system. These conventional ballasts are also quite heavy and bulky. Resistive ballasts have also been used, usually in DC systems, where the current is limited by a resistor placed in series with the lamp. This method, however, dissipates a large amount of power in the resistor and is, thus, very inefficient.

There also have been provided circuits for operating gaseous discharge lamps on a DC current utilizing electronic ballasting and control. One example of this approach is shown in U.S. Pat. No. 3,265,930 — W. F. Powell, Jr., assigned to the General Electric Company, assignee of the present invention, which is hereby incorporated by reference. The Powell patent utilizes a time-ratio control device which includes a regulating transistor connected in series with a coasting inductor, a gaseous discharge lamp and a flyback diode. A sensing resistor is also connected in series with the regulating transistor and the lamp. The sensing resistor and the regulating transistor are connected to a control circuit for controlling the regulating transistor. Power which controls the regulation transistor is provided through a small transformer from the input line voltage, which results in power being continually provided for the control circuit even though the lamp is turned off.

It is desirable to utilize a power supply for the control circuit which energizes the control circuitry substantially only while the lamp is operating. Furthermore, it is impractical to operate some lamps, for example, sodium vapor, on DC. There also are applications where the input voltage available is too high to be utilized by the lamp. Therefore a means of stepping down this voltage is necessary, and this voltage should be useful in operating various types of lamps.

Some lamps, for example sodium vapor, have been known to break apart because of acoustic resonance which occurs when operated at certain frequencies. These frequencies will vary in different lamps. It is also, therefore, desirable to operate these lamps with a voltage wave form which overcomes the acoustic resonance problem.

The most common method of starting gaseous discharge lamps is the application of a high peak voltage across the lamp electrodes in order to begin the ionization process. However, in electronic ballast situations, this high voltage would require the use of high voltage semi-conductors and often high current semi-conductors which are either vary expensive or not available. It is, therefore, desirable to provide a starting circuit which overcomes these problems.

When operating an arc lamp, such as a linear metal halide lamp, in conjunction with a time-ratio control circuit, it is necessary that a transistor bridge inverter be provided that the lamp might be driven with a rectangular wave. The duty cycle of the bridge inverter is controlled in order to maintain proper spectralbalance throughout the length of the lamp. Furthermore, in order to prevent the power supply from being momentarily short circuited as one pair of transistors in the bridge inverter is turned off and the other pair turned on, it is necessary to provide a short period (5 – 15 microseconds) during which all four of the transistors are "off" or nonconducting. However, this momentary interruption of the load current will result in a voltage pulse being generated at the output of the time-ratio control ballast circuit. Such a transient pulse could possibly be of sufficient amplitude to destroy one or more of the transistors in the bridge inverter. It is desirable therefore, to provide a means of limiting the magnitude of this pulse to values which can be tolerated by the transistors.

Accordingly, it is one object of this invention to provide an electronic ballast circuit capable of starting and operating various types of gaseous discharge lamps.

Another object is to provide an electronic ballast utilizing a time-ratio control circuit and an inverter circuit for operating gaseous discharge lamps without the necessity of the normal bulky AC ballast or inefficient resistor ballast.

Another object is to provide an electronic ballast whose control circuitry is powered by a power supply which operates substantially only during the operation of the lamp.

Another object is to provide an electronic ballast utilizing a time-ratio control circuit and an inverter circuit and timing circuitry for operating at least one gaseous discharge lamp.

Another object is to provide an inverter circuit for operating at least one gaseous discharge lamp, the inverter circuit having transient protection for shunting transients back to the input.

Another object is to provide a time-ratio control circuit and inverter circuit for operating gaseous discharge lamps whereby the power for the control circuitry of the time-ratio control is provided by a regenerative feedback power supply.

Another object is to provide an electronic ballast for providing substantially square waves for operating at least one gaseous discharge lamp without acoustic resonance.

Another object is to provide an electronic ballast for operating at least one gaseous discharge lamp having a starting circuit which starts the lamp with a high voltage pulse effectively applied between one lamp electrode and a grounding plane.

Another object is to provide an electronic ballast for operating at least one gaseous discharge lamp at substantially constant wattage.

SUMMARY OF THE INVENTION

In accordance with one form of this invention, there is provided an electronic ballast circuit for operating gaseous discharge lamps including a regulation transistor and control circuitry for operating the regulation transistor. A current sensing means is connected in a circuit relation with the regulation transistor and the lamp. Power for operating the control circuitry is provided by a feedback power supply which energizes the control circuitry substantially only while the lamp is in operation.

In accordance with another form of this invention, there is provided an input means for receiving DC power, a time-ratio control ballast section including a switch means for regulating the current through at least one gaseous discharge lamp and a sensing means for sensing the current. A control circuit is connected to the switch means and sensing means for controlling the time-ratio control circuit. An energy storage device is connected to the switch means. An inverter circuit is connected to the time-ratio control section for applying substantially square waves to the lamp. A starting circuit is provided and connected to one electrode of the lamp and to ground for starting the lamp. A feedback power supply is connected to the inverter circuit, the time-ratio control circuit and the starting circuit for providing low voltage power for these circuits while the lamp is operating.

In accordance with another aspect of the present invention, there is provided a time-ratio control circuit for ballasting a load including at least one gaseous discharge lamp. The circuit includes input means for connecting to a source of electrical power. A transistor switch is connected to the input means for controlling power to the load and control means is connected in circuit and provides drive current to the transistor switch control electrode for controlling conduction of the transistor switch. A coasting inductor is connected serially with the transistor switch and the load across the input means and provides operating power for the load for a predetermined time when the transistor switch is nonconducting. A coasting diode is electrically connected across the input means, one of its electrodes being connected to the junction of the transistor switch and the coasting inductor for providing a return path for the coasting inductor when the transistor switch is nonconducting. Means are provided for preventing discharge of the coasting inductor into the load when the load is momentarily open circuited.

BRIEF DESCRIPTION OF THE DRAWINGS

The subject matter which is regarded as the invention is set forth in the appended claims. The invention, itself however, together with further objects and advantages thereof may be better understood by reference to the following description taken in conjunction with the accompanying drawings in which:

DESCRIPTION OF THE PREFERRED EMBODIMENTS

Figure 1:
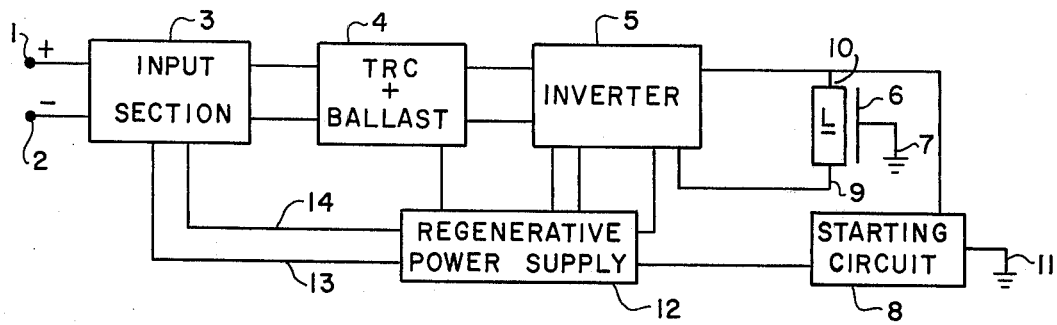
FIG. 1 is a functional block diagram of the circuit embodying one form of the present invention.

Referring now particularly to FIG. 1, a DC input signal is applied across terminals 1 and 2. Input section 3 is connected to input terminals 1 and 2 for further rectifying and filtering the DC signal. A time-ratio control (TRC) ballast circuit is provided in section 4. This TRC circuit may be of a type similar to that shown in U.S. Pat. No. 3,265,930 — W. F. Powell, assigned to General Electric Company, assignee of the present invention. The TRC ballast circuit 4 of the present invention provides an output waveform shown in FIG. 3a. That is, the current rises to a certain predetermined high level and then decreases to a predetermined low level and again rises. The TRC ballast circuit is further connected to an inverter circuit 5. This inverter circuit provides substantially square waves to at least one gaseous discharge lamp L. The gaseous discharge lamp L may be fluorescent, mercury, sodium vapor or other type of gaseous discharge lamps. Gaseous discharge lamp L is connected physically near a grounding plane 6 which may be a fixture grounded at point 7. The inverter circuit 5, in this embodiment, is a transistor inverter circuit.

Starting circuit 8 is connected to one side of lamp L through conductor 10 and to ground at point 11. The starting circuit 8 starts lamp L with respect to ground rather than across conductors 9 and 10 as has been done in the past. By starting lamp L in this manner, the application of a high voltage starting pulse through the inverter and TRC electronic circuitry is avoided. Starting circuit 8 provides a high voltage pulse between conductor 10 of lamp L and the grounding plane 6 which is grounded at 7 and the return path is provided back through ground point 11 of the starting circuit.

A regenerative feedback power supply 12 receives power from inverter 5 so that this power supply is charged substantially only while lamp L is conducting current. Furthermore, this regenerative power supply provides power for the starting circuit, the inverter and the TRC circuit by energizing the regenerative power supply substantially only while the lamp is conducting. Energy is therefore not wasted as has been in the past. In the past, the power supply was connected directly to the input such that the circuit was constantly energized. By energizing the power supply substantially only while the lamp is on, the components of the TRC circuit, inverter and starting circuit are not continuously energized while the lamp may be out of the socket or while the lamp is not in use. An initial precharging of the power supply, however, is provided on lines 13 and 14 from the input terminals 1 and 2, having a relatively slow time constant. By slowly charging the regenerative power supply, the TRC circuit may be in the enabled mode when it is desired to start the lamp.

Figure 5:
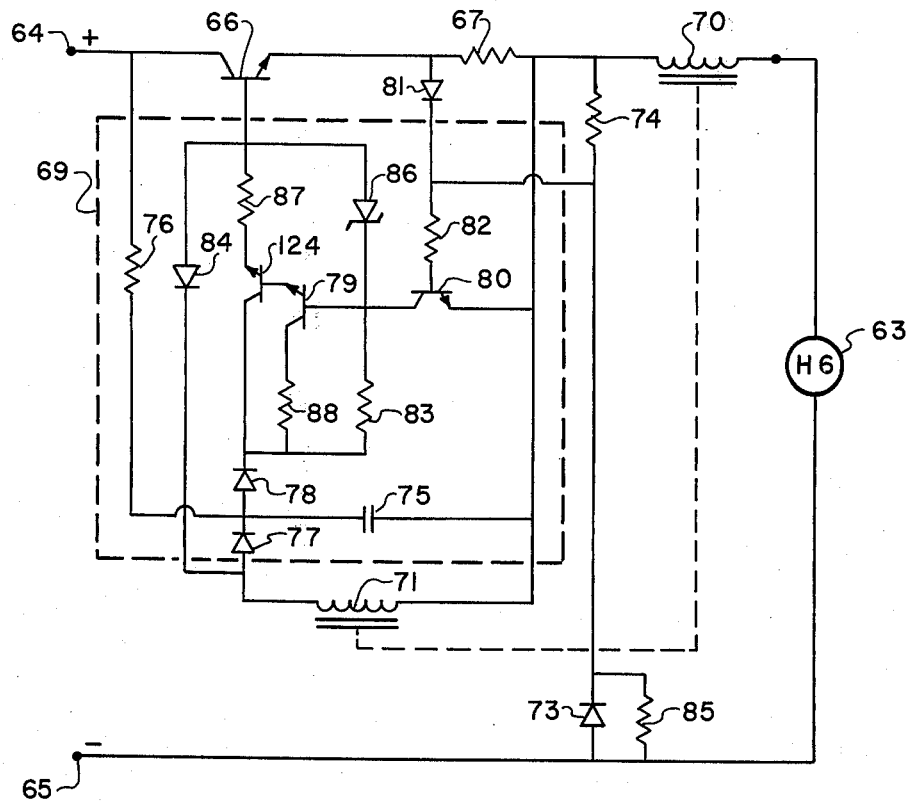
FIG. 5 is a more detailed schematic circuit diagram of the circuit shown in FIG. 4.
Figure 2:
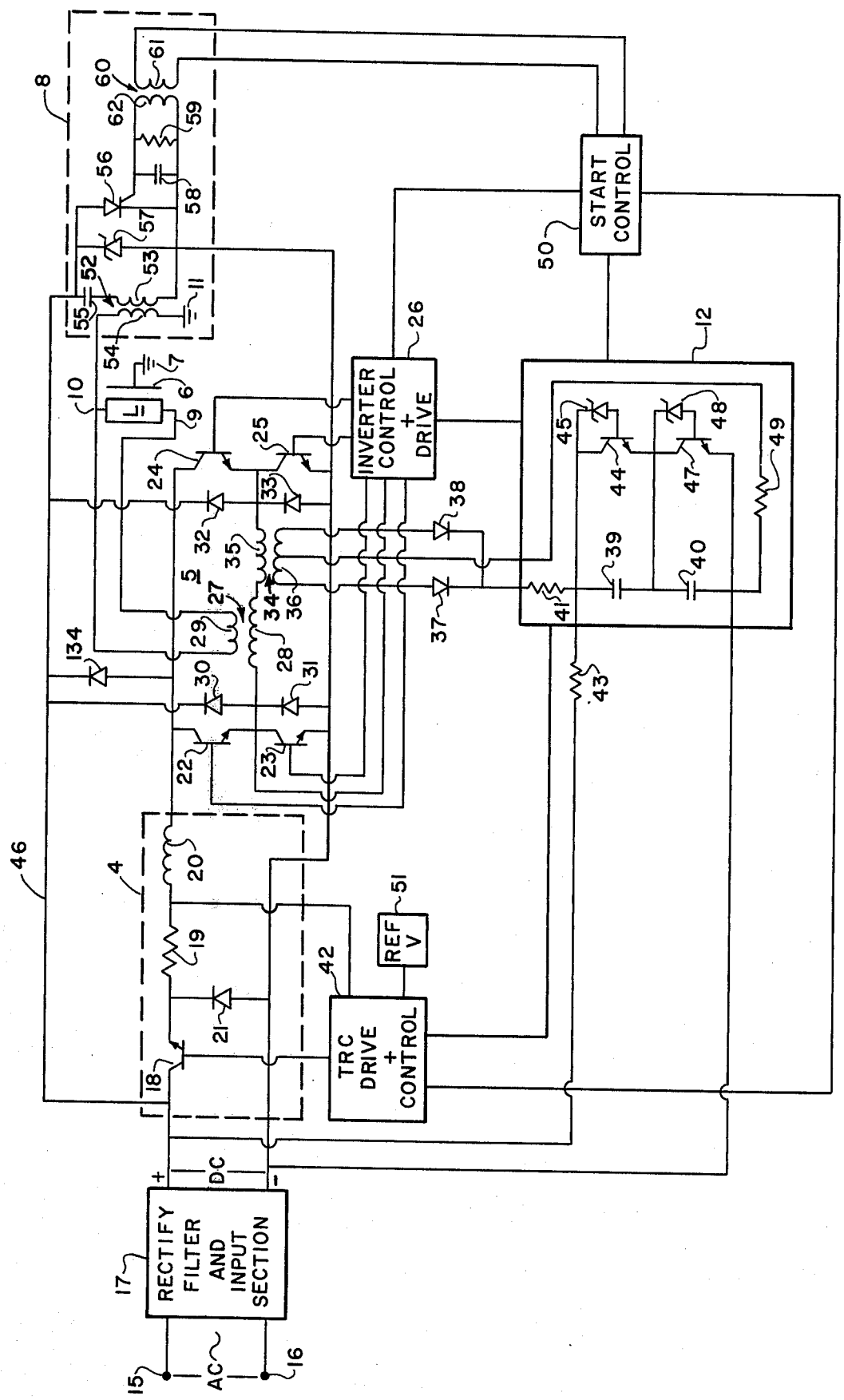
FIG. 2 is a schematic circuit diagram of a circuit embodying one form of the present invention.

Referring now to FIG. 2, there is provided a somewhat modified and more detailed schematic circuit diagram of the circuit shown in FIG. 1. FIG. 2 shows an AC input connected across lines 15 and 16. Input circuit 17 includes input section 3 and may include a standard full wave rectifier and filter of the type well known in the art to produce a DC output. The TRC ballast circuit 4 is shown connected to rectifier filter and input circuit 17. The TRC ballast circuit 4 includes transistor switch 18 having a base, an emitter and a collector. The emitter and collector are connected in series with sensing resistor 19 and coasting inductor 20. Sensing resistor 19 senses current which flows through transistor 18 and eventually through gaseous discharge lamp L and feeds back this information to the TRC drive and control circuit 42. The TRC drive and control circuit 42 is connected to the base of transistor 18 for providing regulation information to this transistor. One embodiment of the TRC drive and control circuit 42 is shown in FIG. 5 and will be discussed below.

Coasting inductor 20 is used to supply current to gaseous discharge lamp L while transistor 18 is off. Flyback diode 21, which has its cathode connected to transistor 18 and resistor 19, provides a return path for coasting inductor 20 while transistor 18 is off. The TRC ballast circuit 4, in this embodiment, effectively steps down the input voltage at the output of filter, rectifier and input 17. A step up TRC circuit, similar to the one shown in FIG. 12 of U.S. Pat. No. 3,265,930, could be used if it were desired to step up voltage. The TRC ballast circuit 4 is connected to transistor inverter 5. Transistor inverter 5 includes transistors 22, 23, 24 and 25. Transistor 22 has its collector connected to coasting inductor 20 and its emitter connected to the collector of transistor 23. The emitter of transistor 23 is connected to the negative side of the DC input which is at the output of rectifier and input filter 17 and to the anode of flyback diode 21. Transistor 24 has its collector connected to the coasting inductor 20 and its emitter connected to the collector of transistor 25. The emitter of transistor 25 is also connected to the anode of the flyback diode 21. The bases of transistors 22 – 25 are connected to inverter control and drive circuit 26. This inverter control and drive circuit is shown in part in FIG. 7.

Figure 3:
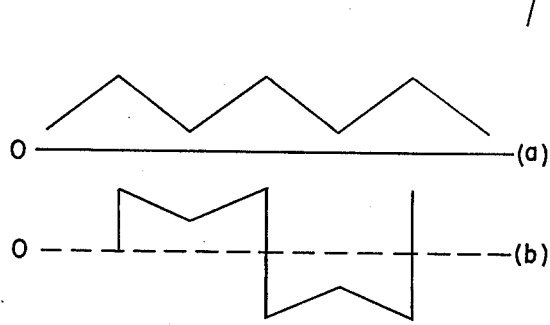
FIG. 3 is a diagram of the time-ratio control and inverter output wave forms which occur as a result of one form of the present invention.

Transformer 27 has a secondary winding 29 and further, a primary winding 28 connected to the emitter of transistor 22. Secondary winding 29 is connected across conductors 9 and 10 to lamp L for providing operating voltage for the lamp. The operating voltage across lamp L will be rectangular waves in a form of substantially square waves as shown in FIG. 3b. By operating gaseous discharge lamp L on square waves, problems of acoustic resonance, which have been known in the past to actually break the lamp casings, have been overcome. It is believed that a lamp, such as sodium vapor lamp, will go into acoustic resonance because of the impression across its electrodes of certain power frequencies corresponding to various resonance modes. By utilizing square waves, a reduced spectrum of power frequencies is applied across the lamp and the magnitude of the fundamental frequency is very low. A pure square wave would impress no power frequencies on the lamp. This circuit reduces the magnitude of the power fluctuations to a level where the lamp is kept out of acoustic resonance.

Transistors 22 – 25 have rectifiers 30 – 33, which are diodes, connected to their respective emitters and back to the positive side of the DC input at the output of rectifier, filter and input circuit 17 through line 46. These diodes are used to shunt from their respective transistors, high voltage transients which may occur because of the transformers in the inverter circuit. As stated hereinbefore, when operating a gaseous discharge lamp, such as an arc lamp of the linear metal halide type, in conjunction with a TRC ballasting circuit, it is necessary that a transistor bridge inverter be provided that the lamp might be driven with a rectangular wave. The duty cycle of the bridge inverter is controlled in order to maintain proper spectral balance throughout the length of the lamp. Furthermore, with such an arrangement, in order to prevent the power supply from being momentarily short circuited when one pair of inverter transistors is turned off and the other pair is turned on, it is necessary to provide a short period (~5 to 15 microseconds) during which all four of the transistors are off or nonconducting. This momentary interruption of the load current will result however in the generation of a voltage pulse at the output of the TRC ballast circuit. Such a pulse could possibly be of sufficient amplitude to destroy one or more of the transistors in the bridge inverter.

In accordance with one aspect of the present invention, there is presented, as shown in FIG. 2, a TRC circuit for ballasting a load including at least one gaseous discharge lamp, the circuit including, inter alia, means for preventing discharge of the coasting inductor 20 into the load when the load is momentarily open-circuited. In other words, to prevent possible destruction of inverter transistors 22 – 25 when they are all momentarily nonconducting, a rectifier diode 134 is connected to the collectors of transistors 22 and 24 and line 46 which is connected back to the positive side of the DC input further for shunting transients back to the input away from the solid state inverter. A further discussion of this aspect of the present invention will be had hereinafter.

A power supply transformer 34 is connected between transformer 27 and the emitter of transistor 24 and is included in part of the regenerative power supply circuit 12. The power supply transformer 34 includes primary winding 35 and secondary winding 36. Transformer winding 35 is energized only while the inverter circuit and thus the lamp is conducting, therefore power is supplied to the various control circuits only during lamp conduction. Diode 37 is connected to one side of secondary winding 36 and diode 38 is connected to the other side of the winding. The winding is also center tapped and the anodes of diodes 37 and 38 are connected together for full wave rectification of the signal across secondary winding 36. Capacitors 39 and 40 are connected in series with diodes 37 and 38 through resistor 41 and serve as the main capacitors for the power supply. Capacitors 39 and 40 are precharged from the output of the rectifier, filter and input section 17 through resistor 43, which is a large resistor on the order of a megohm, and provides a long time constant for the charge time of capacitors 39 and 40. This precharge of the capacitors 39 and 40 provides for the transistor 18 to be periodically placed in the enable state so that it will come on and provide current for the lamp when a starting voltage is applied to the lamp.

However, the main power for charging capacitors 39 and 40 is provided through secondary winding 36 and diodes 37 and 38. Zener diode 45 is connected across the base-collector junction of transistor 44. Zener diode 48 is connected across the base-collector junction of transistor 47. Transistor 44 is connected across capacitor 39 and transistor 47 is connected across capacitor 40. These zener diode-transistor arrangements regulate the voltage on capacitors 39 and 40. Resistor 49 is connected to one side of capacitor 40 to provide a return path to the junction of the tap on secondary winding 36. This is only one embodiment of regenerative power supply 12. Other embodiments may be used, for example, the one shown in FIG. 5 which will be discussed below.

The regenerative power supply 12 supplies power for the TRC drive and control 42, start control 50, inverter control and drive 26 and the low voltage side of the starting circuit 8. The TRC drive and control circuit 42 is connected to reference voltage source 51. It is further connected to the base of transistor 18. The TRC drive and control 42 compares the voltage from sensing resistor 19 to the reference voltage and thus biases transistor 18 into and out of conduction accordingly. Specific circuitry involved in the TRC drive and control circuit may be of the type shown in U.S. Pat. No. 3,265,930 — W. F. Powell. An alternate embodiment of the TRC drive and control circuitry is shown in FIG. 5 and will be explained below.

Starting circuit 8 is connected to lamp electrode 10 and to ground 11 and is further connected to start control circuit 50. The starting circuit 8 includes transformer 52 having primary winding 53 and secondary winding 54. Capacitor 55 is connected between primary winding 53 and line 46 which provides a relatively high voltage for SCR 56 and is charged through line 46. SCR 56 having anode, cathode and gate electrodes is connected across capacitor 55 and primary winding 53. Zener diode 57 is connected across the SCR. Capacitor 58 and resistor 59 are connected in parallel and across the cathode and gate of the SCR for transient suppression which prevents false triggering of the SCR. Transformer 60 having primary winding 61 and secondary winding 62 is also included in the starting circuit. Primary winding 61 is connected to start control circuit 50 which receives its power from power supply 12 for energizing the primary winding 51. Secondary winding 62 is connected across the gate-cathode of the SCR for providing a starting pulse for the SCR. When the SCR is turned on, capacitor 55 discharges a current through primary winding 53 and a voltage is induced in secondary winding 54 of transformer 52. This applies a high voltage between lamp cathode 10 and ground point 7 which is further tied to ground point 11. The high voltage starting pulse, therefore, is not applied across the lamp terminals as was done in the prior art, since it could cause destruction of the solid-state devices in the TRC circuit 4 and the transistor inverter circuit 5. The start control circuit 50 enables energization of the starting circuit 8, inverter drive and control circuit 26 and the TRC drive and control circuit 42, approximately simultaneously. Start control circuit may be of the type well known in the art and may include a flip-flop having one state being the "on" mode and the other state being the "off" mode.

The circuit as shown in FIG. 2 operates as follows: a relatively high voltage AC input is received across input terminals 15 and 16. Rectifier, filter and input section 17 converts the AC input signal to DC. A pulse is provided to the base of transistor 18 from TRC drive and control circuit 42. Low voltage power is provided from regenerative feedback power supply 12. Capacitors 39 and 40 have an initial voltage placed across them in order to provide initial energy for TRC drive and control circuit 42. This voltage is provided from the output of rectifier, filter and input section 17. When the transistor 18 conducts, current travels through its collector-emitter path through sensing resistor 19 and coasting inductor 20. Coasting inductor 20 charges to a certain potential and current further travels through one side or the other of inverter circuit 5. When one side of the inverter 5 conducts, current travels through the collector-emitter path of transistor 22 through primary winding 28 and primary winding 35 through the collector-emitter path of transistor 25 and back to the negative side of the output of rectifier, filter and input section 17. If the lamp has been started by starting circuit 8, a current will then flow through secondary winding 29 of transformer 27 and through the lamp electrodes 9 and 10.

When the output current through sensing resistor 19 reaches a predetermined level, TRC drive and control circuit 42 responds to this due to feedback and shuts off transistor 18. When transistor 18 shuts off, the energy in inductor 20 discharges through transistor 22 and transistor 25 and back through flyback diode 21 to the other side of inductor 20. When this current discharge reaches a predetermined low level, the current is sensed through sensing resistor 19, and the TRC drive and control circuit 42 will again turn on transistor 18.

Figure 7:
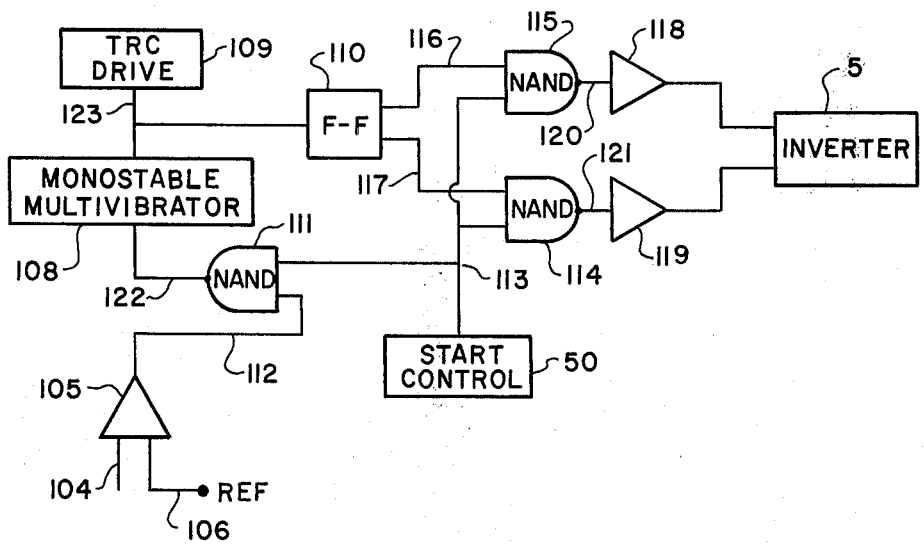
FIG. 7 is a schematic circuit diagram of a portion of the TRC control and inverter control shown in FIG. 2.

The inverter control drive and drive circuit 26 and the TRC drive and control circuit 42 are synchronized such that for each full cycle of TRC sawtooth output, as shown in FIG. 3a, there is a half cycle pulse of inverter output to the lamp as shown in FIG. 3b. This provides for a balanced output so that the positive and negative half cycles of the inverter circuit are approximately equal in width and of relatively equal magnitude. The circuit which provides this timing is shown in FIG. 7.

The inverter control and drive circuit 26 of FIG. 2 then causes the other side of the inverter to come on, that is, a current will flow through transistor 24, through primary windings 35 and 28 in the opposite direction to the original inverter conduction path and through transistor 23 causing a negative square wave to be applied to lamp L through secondary winding 29. A current is induced in secondary winding 36 of transformer 34 and travels through diodes 37 and 38 and the center tap line of secondary winding 36 for charging capacitors 39 and 40. This charging rate is rapid as compared to the precharge rate through resistor 43. The power supply and therefore capacitors 39 and 40 are charged substantially only while there is current through the inverter circuit, that is, while the electronic circuitry is operating. This power supply energizes the TRC drive and control, the inverter control and drive, the start control and the starting circuit.

When it is desired to start the circuit, the start control circuit 50 is initiated applying enabling voltage to the TRC drive and control 42, the inverter control and drive 26 and the starting circuit 8. The starting circuit 8 operates as follows: a voltage pulse is applied from start control 50 across primary winding 61 which induces a voltage into secondary winding 62 and causes a gating pulse to appear at the gate of SCR 56. When SCR 56 comes on, a current flows through primary winding 53 of transformer 52 and therefore secondary winding 54 is energized. Secondary winding 54 which is connected to lamp cathode 10 then causes a current to flow through lamp cathode 10 capacitively through grounded fixture 6 to ground and back to ground 11 on the other side of secondary winding 54. This causes a high voltage starting pulse to be applied to one electrode of the lamp. This occurs while the inverter is applying voltage across the lamp causing gas ionization and current to flow between electrodes 9 and 10, thus starting the lamp. The lamp is turned off when the inverter control drive 26 shuts off the inverter circuit.

Figure 8:
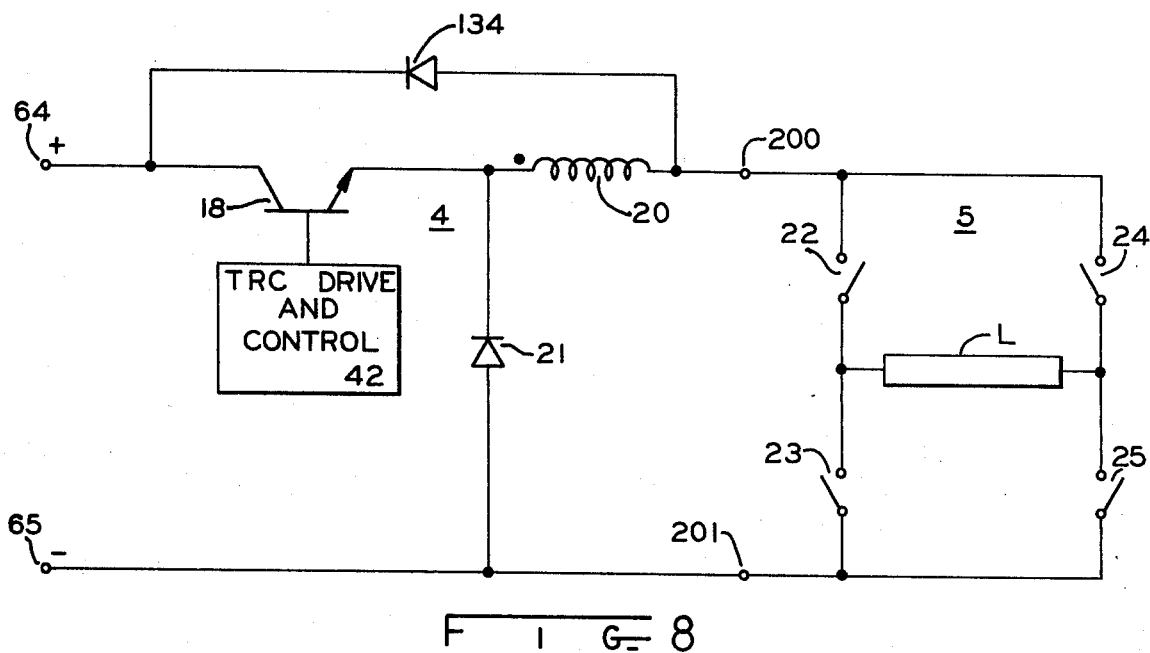
FIG. 8 is a simplified schematic representation of that portion of FIG. 2 showing the TRC ballast circuit with transient protection.

Referring now to FIG. 8, there is shown a simplified schematic representation of that portion of FIG. 2 showing the TRC ballast circuit 4 with transient protection for inverter transistors 22 – 25. As stated hereinbefore, such a TRC circuit is useful for operating at least one gaseous discharge lamp L which may be of the linear metal halide type. Bridge inverter 5 is of the high current switching type and may be of the type disclosed in U.S. Pat. No. 3,700,960 — Lake, assigned to the same assignee as the present invention.

Bridge inverter 5 includes power transistors 22 – 25 shown for the sake of simplicity as switches. Such transistors may be of the high voltage, high current type as disclosed in the aforementioned Lake patent. Lamp L is driven from rectangular waves through alternate pairs 22 and 25, 23 and 24, of bridge inverter 5. Further details of the operation of such an inverter may also be had by referring to the Lake patent, U.S. Pat. No. 3,700,960.

TRC ballast circuit 4 serves to control the current through lamp L. Included in ballast circuit 4 is input means in the form of a pair of input terminals 64 and 65 for connecting the circuit to a source of electrical power, such as, for example, a bulk power supply (not shown) capable of producing approximately 520 volts DC. Input terminal 64 has been chosen to be the positive terminal and terminal 65 the negative. A transistor switch denoted 18 is provided for controlling power to the lamp load and is arranged to be periodically opened or closed to allow input power to the load in such a way as to maintain some desired load voltage and/or current function for variations in the input power source and variations in the load itself. Control means are provided in the form of a TRC drive and control circuit 42 which provides drive current for controlling conduction of the transistor switch 18. Also included is a coasting inductor 20 connected serially in circuit with transistor switch 18 and the load across input terminals 64 and 65. Coasting inductor 20 provides operating power for the lamp load for a predetermined time when power switch 18 is nonconducting. A coasting diode 21 has its cathode connected to the junction of power switch 18 and coasting inductor 20 and its anode connected to negative input terminal 65. Coasting diode 21 provides a return path for the coasting inductor 20 when switch 18 is nonconducting.

The TRC ballast circuit 5 operates in the following manner. Upon connecting input terminals 64 and 65 to an appropriate source of DC energy, transistor switch 18 is closed and input power is applied to the energy storage coasting inductor 20, thence to the load. Current will begin to build up through the load and a voltage will be developed at the output terminals 200 and 201. At some predetermined time, a "control, sense and amplify circuit" (not shown) will determine that "maximum" conditions are reached and it will signal control circuit 42 to open transistor switch 18. Prior to this, the coasting diode 21 will be reverse biased and the coasting inductor 20 will be of positive polarity. However, when the transistor switch 18 opens, the energy stored in the magnetic field of the coasting inductor 20 causes this polarity to reverse and thus maintain the same direction as the load current. Coasting diode 21 will become forward biased and will conduct the full load current. As current flows, energy will be dissipated in the load and will be removed from coasting inductor 20. At some lower limit determined by the "control sense and amplify circuit", transistor switch 18 will close and the cycle will again begin. By proper choice of the sense function, regulated load voltage, load current or power can be achieved and the transistor switch duty cycle will be a function of the various circuit components and parameters.

As has been hereinbefore stated, momentary interruption of the load current will result in a voltage pulse being generated at the output of TRC ballast circuit 4. This pulse could be of sufficient amplitude to destroy one or more of the transistors 22 – 25 in the bridge inverter 5. In order to limit the magnitude of this pulse to values which can be tolerated by the transistors, there is provided a clamping diode 134 connected in parallel with the series combination of the transistor switch 18 and the coasting inductor 20. As will be understood by those skilled in the art, when transistors switches 22 – 25 are all opened simultaneously while current is flowing in coasting inductor 20, the rapid drop in current will cause a voltage to be generated in the coasting inductor 20 according to the equation: $V = L\,di/dt$, the right hand end of the inductor 20 being positive. To prevent this voltage from exceeding the collector to emitter voltage rating of the transistors represented by 22 – 25, clamping diode 134, as soon as the voltage at the right hand terminal of inductor 20 exceeds the supply voltage by about 0.7 volts, starts to conduct permitting the energy stored in inductor 20 to flow back into the power supply.

Figure 9:
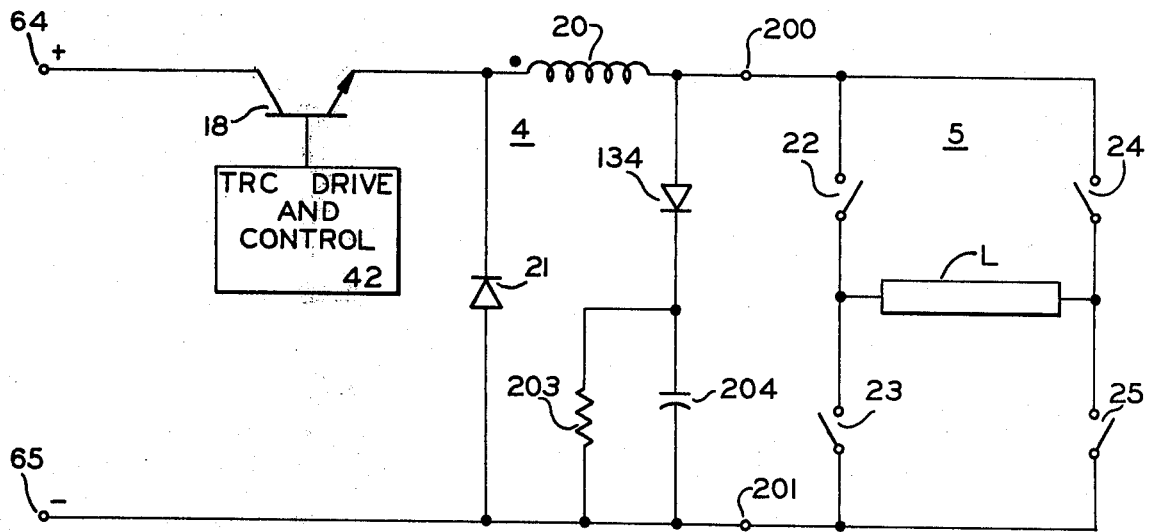
FIG. 9 is an alternate arrangement of the circuit of FIG. 8.

Referring now to FIG. 9 there is shown an alternate circuit for accomplishing the same result as that in FIGS. 2 and 8. The TRC ballast 4 and the bridge inverter 5 are essentially the same as shown in FIG. 8. However, in the arrangement as shown in FIG. 9, the voltage pulse occurring at the input to the bridge inverter 5 is limited by a network consisting of diode 134, a resistor 203 and capacitor 204.

This arrangement operates in the following manner. When either pair of the transistor switches 22 and 25 or 23 and 24 of the bridge inverter 5 is closed, capacitor 204 is charged up to the output potential of the TRC ballast 4 through diode 134. As soon as all four switches in the bridge inverter 5 are opened, the current from the coasting inductor 20, which now can no longer flow through the load, is permitted to flow through diode 134 and into capacitor 204, charging it to an even higher potential. A rise in voltage across capacitor 204 will be $\Delta e = it/C$, where $i$ is the current flowing into the capacitor in amperes, $t$ is the time duration of that current in seconds and $C$ is the capacity in farads. It is possible to select a capacity for 204 which will limit Δe to an acceptable value because the time during which capacitor 204 is being charged is short, only 5 to 15 microseconds, and the current is approximately equal to the load current. Resistor 203 is required in order to discharge capacitor 204 to approximately the load voltage during one conduction period of either pair of transistor switches of the bridge inverter 5.

Although resistor 203 is shown connected across the capacitor 204, it could be connected across the diode 134 (not shown). In this case, some of the energy stored in the capacitor during the 5 to 15 microseconds "off" of the bridge inverter 5 would be dumped back into the load instead of being dissipated in the resistor 203. In such an arrangement, this might be on the order of 2 or 3 watts, a rather trivial amount compared to the normal load power of, say 1250 watts.

Figure 6:
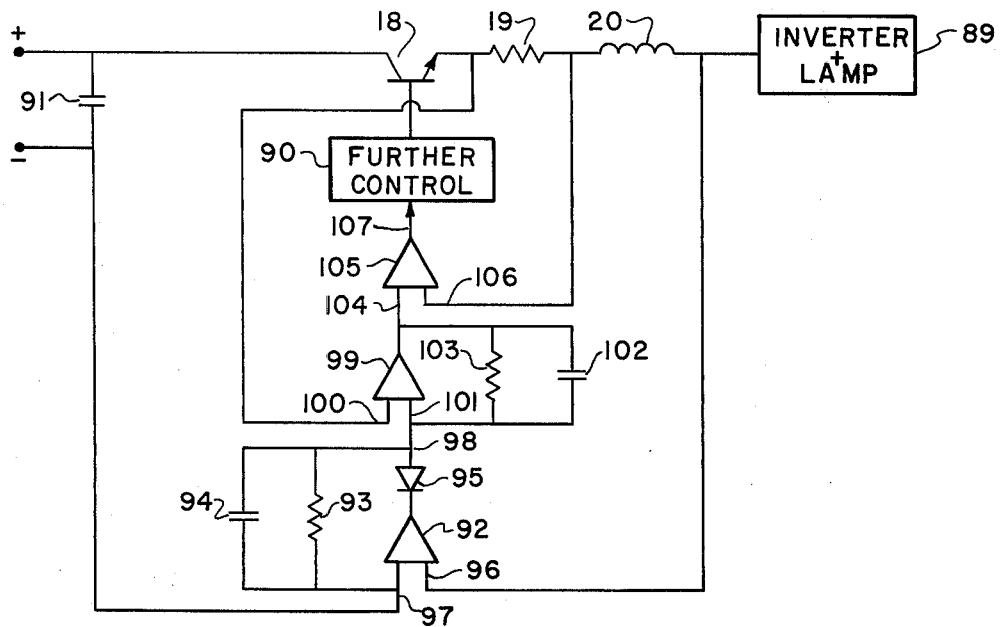
FIG. 6 is a schematic circuit diagram of a portion of the TRC control circuit shown in FIG. 2.

The circuit shown in FIG. 6 includes a part of the TRC drive and control circuit 42 shown in FIG. 2. One of the purposes of the circuit of FIG. 6 is to provide an approximately constant wattage through the lamp which is included in block 89. Operational amplifier 92 and diode 95 provide no output at node 98 if the voltage on input 96 is below a predetermined level, e.g. 100 volts. While inductor 20 is discharging and transistor 18 is off, the voltage on input 96 is approximately lamp voltage. When lamp voltage exceeds the predetermined level, operational amplifier 92 and diode 95 conduct placing a signal on input 101 of operational amplifier 99. Capacitor 94 and resistor 93 connected between input 97 and output 98 enable operation amplifier 92 to act as an integrator: thus, an average signal is applied to input 101.

Operational amplifier 99, which also acts as an integrator with capacitor 102 and resistor 103 connected thereacross, adds the input signals on lines 100 and 101 and provides an input signal to comparator 105. Comparator 105 compares signals on lines 104 and feedback line 106, which is connected to sensing resistor 19. If the voltage is above the predetermined level the comparator 105 will cause transistor 18 to conduct less and in proportion to the rise in lamp voltage. Thus an approximate constant wattage through lamp 89 is obtained.

The circuit shown in FIG. 7 shows one portion of the inverter control and drive circuit 26 as a part of the TRC drive and control circuit 42 shown in FIG. 2. The circuit shown in FIG. 7 provides for the timing between the TRC drive and the inverter drive so that for each full cycle of TRC output, (FIG. 3a) there is a half cycle of inverter output (FIG. 3b). This maintains inverter output signals which are approximately equal in width and magnitude and which provides balanced lamp operation.

Start control 50 is connected to inputs 113 of NAND gates 114, 115 and 111. The output of comparator 105 is connected to the other input 112 of NAND gate 111. When both inputs to NAND gate 111 are negative, a positive output at 123 is provided. Monostable multivibrator 108, which is connected to the output of NAND gate 111, provides a pulse to TRC drive circuit 109 and flip-flop (F—F) 110. When this input to flip-flop 110 is positive, output line 116 goes negative. When both lines 113 and 116 are negative the NAND gate 115 provides a positive output signal on line 120 biasing amplifier 118 into conduction. Amplifier 118, which is connected between NAND gate 115 and inverter 5 drives one side of the inverter into conduction. When there is a negative signal at the input 123 of F—F 110, output 117 goes negative and output 116 goes positive. This gives a positive signal on line 121, which is the output of NAND gate 114, when there is also a negative signal on line 113 from the start control. Amplifier 118 goes off and amplifier 119 conducts thus driving the other side of inverter 5.

Figure 4:
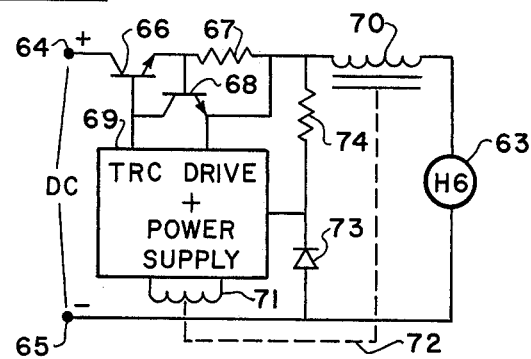
FIG. 4 is a schematic circuit diagram of still another form of the present invention.

Referring now to FIG. 4, there is provided a time-ratio control circuit for operating at least one gaseous discharge lamp which is capable of being operated from direct current (DC). For example, in this embodiment a mercury lamp 63 is provided. A DC input is received across input terminals 64 and 65. Regulation transistor switch 66 is connected to input terminal 64 at its collector. The emitter of transistor 66 is connected to sensing resistor 67. Transistor 68 has its base and emitter connected across sensing resistor 67. The collector of transistor 68 is connected to the base of transistor 66. Transistor 68 therefore shunts some base current away from transistor 66 when the current through resistor 67 becomes too high thus, in part, regulating transistor 66. The TRC drive and power supply are indicated in block 69 for controlling transistor 66. Block 69 is further connected to the emitter of transistor 68.

A transformer includes primary winding 70 and secondary winding 71 magnetically coupled. Mercury lamp 63 is connected to the primary winding 70 and to flyback diode 73 and to the other side of the DC input 65. Primary winding 70, in one aspect, acts as an energy storing device: that is, when transistor 66 is on, energy is stored in primary winding 70 while there is current through the lamp. However, when transistor 66 is turned off, the energy in transformer primary 70 is discharged through lamp 63 through flyback diode 73 and resistor 74 so that the lamp is placed in the coasting mode. After a time, transistor 66 then turns back on when the current through resistor 74 is sensed to be at a predetermined level; once again, the lamp current increases in mercury lamp 63. Resistor 74 is connected between inductor 70 and diode 73 and serves as a sensing resistor in the coasting mode. Thus, in this circuit, the DC input voltage is effectively stepped down by applying an average voltage across lamp 63 by the time-ratio control circuit.

As was stated before, primary winding 70 is magnetically coupled to secondary winding 71. This transformer arrangement provides power for the TRC drive and power supply. In this way, power is supplied and the coponents are substantially only energized while the lamp 63 is conducting, that is, only when power is needed. The prior art provided energization of the TRC drive and power supply circuit at all time from the DC input, thus the components in those prior art circuits were constantly energized or in their enabled position so that power was often wasted.

A more detailed embodiment of the circuit of FIG. 4 is shown in the circuit of FIG. 5. Circuit 69 in FIG. 5 includes one specific embodiment of the TRC drive and power supply shown in FIG. 4. The main power supply capacitor is capacitor 75. Capacitor 75 is precharged from the positive terminal 64 through resistor 76 which is a large resistor in the order of a megohm. Resistor 76 provides for a long time constant of up to several seconds for the charging of capacitor 75. This enables a starting voltage to be applied to transistor 66 periodically. Capacitor 75, which provides power for the operation of the TRC drive circuit is charge mainly through charging diode 72. Silicon bilateral switch (SBS) 78 provides a threshold voltage for the discharge of capacitor 75. Capacitor 75 then provides power, or collector current for transistors 124, 79 and 80. Transistor 124 supplies base current to regulate transistor 66. Transistor 124 comes on when transistor 79 comes on and both are on while transistor 80 is off. When the current through sensing resistor 67 is too high, transistor 80, which is connected to the current sensing transistor through diode 81 and resistor 82, comes on causing transistors 79, 124 and 66 to turn off. Transistor 80 and resistor 83 effectively short the base of transistor 124 which turns transistor 66 off.

Using this circuit, the current drain from capacitor 75 is very low while the regulator is turned off; that is, while transistor 66 is off. Therefore, a single diode 77 may be used to charge capacitor 75 and this capacitor may be charged during the time when it is supplying maximum current to the regulator circuit.

The anode of diode 84 is connected to the base of transistor 66 and to secondary winding 71. This allows for transistor 66 to be quickly switched off since diode 84 will provide a negative feedback voltage. When transistor 66 starts to turn off, inductor 70 will quickly reverse polarity and this reverses polarity on secondary winding 71 which, in turn, places a negative voltage on the base-emitter junction of transistor 66. The negative voltage is supplied from secondary winding 71 through resistor 67, transistor 66 and diode 84. As the result of diode 84, transistor 66, in this embodiment, will turn off in approximately 1 microsecond as compared to approximately 3 microseconds without this particular circuit. Diode 81 provides isolation so that when resistor 74 has a voltage across it, it will not have resistor 67 in parallel with it. Resistor 74 provides sensing so that when the current reaches a predetermined low level, transistor 80 will turn off allowing transistor 66 to come back on. Resistor 85 is connected in parallel with flyback diode 73. Zener diode 86 is connected between the base of transistor 79 and the base of transistor 66.

The time-ratio control and regenerative power supply circuit of FIG. 5 operates as follows: a DC input is applied across input terminals 64 and 65. Capacitor 75 is slowly charged through large resistor 76. When the threshold voltage of SBS 78 is reached, transistors 124 and 79 conduct causing transistor 66 to come on. When transistor 66 comes on, a current flows through the collector-emitter path of transistor 66, through sensing resistor 67, through primary winding or coasting inductor 70, through mercury lamp 63, and back to the negative side 65. The main power for operating the control circuitry is then provided through the magnetic coupling of primary winding 70 and secondary winding 71. This charges capacitor 75 quickly through diode 77 and capacitor 75 again breaks down SBS 78 and provides power for transistors 124 and 79 and which turn on transistor 66. When the predetermined voltage or current level is reached as sensed by sensing resistor 67, at the emitter of transistor 80, transistor 80 comes on, shortcircuiting the base of transistor 79 through the collector-emitter path of 80. This causes transistors 79 and 124 to turn off, thus turning off transistor 66. Transistor 66 then regeneratively turns off very rapidly due to diode 84 which receives a negative pulse from secondary winding 71 during turn-off. Inductor 70 then discharges through mercury lamp 63 and back through flyback diodes 73 through resistor 74. Thus, the voltage from the input terminals 64 and 65 are effectively stepped down and power for the control feedback circuitry of the time-ratio control circuit is provided substantially only while the lamp is conducting.

The circuit shown in FIG. 2 has been built and operated with components having the following set of values:

| | |
|---|---|
| Transistors 18 & 22 – 25 | - 2XC1172A |
| Transistors 44 & 47 | - MJE3055 |
| Lamp L | - 250W high pressure sodium vapor |
| SCR 56 | - 2N4444 |
| Diodes 30 – 34 | - IN5626 |
| Diode 21 | - SC DA4F |
| Diodes 37 & 38 | - 3SF4 |
| Zener Diodes 45 & 48 | - 5.1v |
| Zener Diode 57 | - 200VDC |
| Capacitor 39 | - 12VDC 15µf |
| Capacitor 40 | - 12VDC 390µf |
| Capacitor 55 | - 600VDC .25µf |
| Capacitor 58 | - 50VDC .01µf |
| Resistor 19 | - 7.2 ohms |
| Resistor 43 | - 1 megohm |
| Inductor 20 | - 4.85mh |
| Transformer 27 | - 1.2 to 1 turns ratio |
| Transformers 34 & 60 | - 1 to 1 turns ratio |
| Transformer 52 | - 1 to 22.7 turns ratio |

The circuit shown in FIG. 5 has been built and operated with components having the following set of values:

| | |
|---|---|
| Transistor 66 | - DTS423 |
| Transistors 79 & 80 | - D16P |
| Transistor 124 | - D27C |
| SBS 78 | - 2N4991 |
| Zener Diode 86 | - 7v |
| Diodes 77, 84, 81 | - IN5960 |
| Primary winding 70 | - 166 turns |
| Secondary winding 71 | - 25 turns |
| Diode 73 | - A28D |
| Resistor 76 | - 150k |
| Resistor 77 | - 56 ohms |
| Resistor 82 | - 100 ohms |
| Resistor 67 | - 2 ohms |
| Resistor 74 | - 5 ohms |
| Resistor 87 | - 56 ohms |
| Resistor 88 | - 330 ohms |
| Resistor 83 | - 6.8k |
| Resistor 85 | - 150k |
| Capacitor 75 | - 100µf |
| Lamp 63 | - 50w mercury vapor |

From the foregoing description of the embodiments of the invention, it will be apparent that many modifications may be made therein. For example, various embodiments of the power supply shown in Block 12 of FIG. 2 may be utilized. It will be understood therefore that these embodiments are intended as exemplifications only and this invention is not limited thereto. It is also understood therefore that it is intended in the appended claims to cover all modifications that follow within the true spirit and scope of this invention.

What we claim as new and desire to secure by Letters Patent of the United States is:

1. A circuit for operating at least one gaseous discharge lamp comprising:
   input means for connecting the circuit to a source of DC electrical power;
   switch means connected to said input means, said switch means having a control electrode;
   sensing means connected to said switch means for sensing the current through said switch means;
   feedback regulation means connected to said sensing means and to said control electrode of said switch means for controlling the conduction of said switch means;

energy storage means connected in a circuit relationship with said switch means for providing lamp operating current for a predetermined time while said switch means is turned off;

said switch means and said energy storage means providing ballasting for the lamp;

an inverter circuit connected in a circuit relation with said switch means;

said inverter circuit being adapted to be connected to the lamp for providing operating voltage for the lamp.

2. A circuit as set forth in claim 1 wherein said inverter circuit includes a plurality of transistors operatively connected for applying substantially square waves to the lamp.

3. A circuit as set forth in claim 1 further including means for timing the turn on of said switch means and said inverter circuit.

4. A circuit as set forth in claim 3 further including means for initiating said inverter at substantially the highest current level through said sensing means.

5. A circuit as set forth in claim 3 wherein said means for timing includes a flip-flop having a control terminal and a pair of output terminals; said flip-flop control terminal being connected to said switch means control electrode; a pair of gates being respectively connected to said flip-flop output terminals; said pair of gates further connected to said inverter for alternatively initiating said inverter.

6. A circuit as set forth in claim 1 further including starting means adapted to be connected to ground and to one electrode of the lamp for applying a relatively high voltage starting pulse between the one electrode of the lamp and ground.

7. A circuit as set forth in claim 6 when said starting circuit includes an SCR.

8. A circuit as set forth in claim 6 further including means for initiating said starting means, said inverter, and said feedback regulation means substantially simultaneously.

9. A circuit as set forth in claim 7 wherein said starting circuit further includes a transformer having primary and secondary windings; said primary winding being connected to said SCR; said secondary winding being adapted to be connected to one electrode of the lamp and to ground for providing a current therebetween.

10. A circuit as set forth in claim 1 further including a relatively low voltage power supply for providing operating voltage at least for said feedback regulation means; means for connecting said power supply to said inverter circuit for charging said power supply substantially only while said inverter circuit is operating.

11. A circuit as set forth in claim 10 further including means for pre-charging said power supply from the source of DC power to provide a precharging time from the DC power source substantially greater than the charging time from said inverter circuit.

12. A circuit as set forth in claim 10 wherein said means for connecting said power supply to said inverter circuit includes a transformer having primary and secondary windings, said primary winding being in a circuit relation with said inverter circuit and said secondary winding being in a circuit relation with said power supply.

13. A circuit as set forth in claim 11 further including a relatively large resistance means connected between the DC source and said power supply thereby providing a relatively long charge time constant.

14. A circuit as set forth in claim 13 wherein said power supply includes at least one capacitance means.

15. A circuit as set forth in claim 2 further including means for providing transient protection for said plurality of transistors.

16. A circuit as set forth in claim 15 wherein said means for providing transient protection includes a plurality of diodes respectively connected to said plurality of transistors and further connected to the source of DC voltage.

17. An electronic ballast circuit for operating at least one gaseous discharge lamp comprising:

input means for connecting the circuit to a source of DC power;

first switch means having a control electrode, said first switch means being connected to said input means;

first sensing means connected to said first switch means for sensing current;

control means connected to said sensing means and to said control electrode for controlling the conduction of said first switch means;

output means for connecting the circuit to at least one gaseous discharge lamp;

a power supply connected to said output means and to said control means for operating at least said control means substantially only while the lamp is operating.

18. A circuit as set forth in claim 17 wherein said power supply includes a transformer having a primary and a secondary winding; said primary winding being connected between said first sensing means and said output means; said secondary winding being connected to said control means; said primary winding being adapted to energize said secondary winding and to supply lamp current while said first switch means is non-conductive.

19. A circuit as set forth in claim 18 further including capacitance means connected to said secondary winding whereby said capacitance means is charged through said secondary winding only while the lamp is conducting.

20. A circuit as set forth in claim 19 further including means for pre-charging said capacitance connected to said input means, said means for precharging having a relatively long time constant as compared to the charging of said capacitance through said secondary winding.

21. A circuit as set forth in claim 19 further including a threshold device connected between said capacitance means and said control means.

22. A circuit as set forth in claim 19 further including a rectifier connected between said control electrode of said switch means and said secondary winding, said rectifier being poled in a direction for increasing the turn-off speed of said switch means.

23. A circuit as set forth in claim 19 further including a second sensing means connected to said primary winding and a second switch means having a control electrode, said control electrode of said second switch means being connected to said first sensing means and said second sensing means; said second switch means being connected in a circuit relation with said first switch means for turning off said first switch means at a first predetermined current level through said first sensing means and turning on said first switch means at a second predetermined current level through said second sensing means.

24. A circuit as set forth in claim 18 wherein said primary winding stores energy while said first switch means is conducting and discharges energy through the lamp for a predetermined time while said first switch means is non-conducting.

25. A circuit as set forth in claim 24 further including a second rectifier connected between said output means and said primary winding and poled for conducting current during the energy discharge of said primary winding.

26. An electronic ballast circuit for operating at least one gaseous discharge lamp comprising:
   input means for connecting the circuit to a source of DC power;
   transistor switch means having a control electrode, said switch means being connected to said input means;
   sensing means connected to said switch means for sensing current therethrough;
   energy storage means connected in circuit relation with said switch means for monitoring lamp voltage;
   control means for controlling the conduction of said switch means connected to said sensing means, said energy storage means and said control electrode of said switch means;
   said control means including means for maintaining substantially constant wattage through the lamp; said means for maintaining substantially constant wattage including an operational amplifier having a pair of amplifier input terminals and an output terminal; one of said amplifier input terminals being connected to said energy storage means; an output signal being provided when the voltage across said energy storage means exceeds a predetermined value; a comparator having a pair of comparator input terminals and an output terminal; said amplifier output terminal being connected to one of said comparator input terminals; the other of said comparator input terminals being connected to said sensing means; said comparator output terminal being connected to said control electrode of said switch means, whereby said switch means conducts less current when the voltage across said energy storage means exceeds a predetermined value; and
   output means for coupling the ballast circuit including the energy storage means to the lamp.

27. The circuit as set forth in claim 26 further including a diode connected to said amplifier output terminal.

28. A time-ratio control circuit for ballasting a gaseous discharge lamp, comprising:
   a pair of input terminals for connecting the circuit to a source of DC electrical power;
   a pair of output terminals for connecting the circuit to the lamp;
   a transistor switch connected to the positive input terminal and one of the output terminals for controlling power to the lamp, the switch having a base electrode;
   control means connected in circuit and providing base drive to the base electrode for controlling conduction of the transistor switch;
   a coasting inductor connected serially with the transistor switch and the output terminals across the input terminals for providing operating power for the lamp for a predetermined time when the transistor switch is non-conducting;
   a flyback diode having a cathode connected to the junction of the transistor switch and the coasting inductor and an anode connected to the negative input terminal, the diode serving to provide a return path for the coasting inductor when the transistor switch is non-conducting;
   means for providing a return path for the coasting inductor when lamp current is momentarily interrupted including:
   a clamping diode connected in parallel with the series combination of the transistor switch and the coasting inductor.

29. A time-ratio control (TRC) circuit for ballasting a load including at least one gaseous discharge lamp, comprising:
   input means for connecting the circuit to a source of DC electrical power;
   output means for connecting the circuit to the load;
   a transistor switch connected to the input means and the output means for controlling power to the load, the switch having a control electrode;
   control means connected in the circuit and providing drive current for controlling conduction of the transistor switch;
   a coasting inductor connected serially with the transistor switch and the output means across the input means for providing operating power for the load for a predetermined time when the transistor switch is non-conducting;
   a flyback diode connected between the junction of the transistor switch and the coasting inductor and the other side of the input means for providing a return path for the coasting inductor when the transistor switch is non-conducting; and
   means for providing a return path for the coasting inductor when the load is open circuited.

30. The TRC circuit of claim 29 wherein the means for providing includes a clamping diode connected in parallel with the series combination of the transistor switch and the coasting inductor.

31. A time-ratio control (TRC) ballast circuit for a periodically interruptible, negative resistance load, the circuit being of the type including a transistor switch connected serially with a coasting inductor and a pair of output terminals across an electrical energy source and including control means providing base drive current for controlling conduction of the transistor switch, the improvement comprising:
   means for providing a return path for the coasting inductor when the load is momentarily interrupted.

32. The TRC ballast circuit of claim 31 wherein the means for providing includes a clamping diode connected in parallel with the series combination of the transistor switch and the coasting inductor.

* * * * *